US012664428B2

(12) United States Patent
Schockaert

(10) Patent No.: US 12,664,428 B2
(45) Date of Patent: Jun. 23, 2026

(54) GENERATING VIRTUAL SENSORS FOR USE IN INDUSTRIAL MACHINES

(71) Applicant: PAUL WURTH S.A., Luxembourg (LU)

(72) Inventor: Cédric Schockaert, Wiltz (LU)

(73) Assignee: PAUL WURTH S.A., Luxembourg (LU)

( * ) Notice: Subject to any disclaimer, the term of this patent is extended or adjusted under 35 U.S.C. 154(b) by 513 days.

(21) Appl. No.: 18/282,063

(22) PCT Filed: Mar. 15, 2022

(86) PCT No.: PCT/EP2022/056710
§ 371 (c)(1),
(2) Date: Sep. 14, 2023

(87) PCT Pub. No.: WO2022/194871
PCT Pub. Date: Sep. 22, 2022

(65) Prior Publication Data
US 2024/0152750 A1      May 9, 2024

(30) Foreign Application Priority Data
Mar. 16, 2021      (LU) ........................................ 102672

(51) Int. Cl.
*G06N 3/08*                (2023.01)
(52) U.S. Cl.
CPC ..................................... *G06N 3/08* (2013.01)

(58) Field of Classification Search
CPC ...... G06N 3/08; G05B 19/406; G05B 23/024; G05B 13/0265; G05B 23/0221; G05B 2219/37537
See application file for complete search history.

(56) References Cited

U.S. PATENT DOCUMENTS

2021/0169417 A1* 6/2021 Burton ................. A61B 5/4815
2021/0272696 A1* 9/2021 DeMazumder ........ G16H 15/00
(Continued)

OTHER PUBLICATIONS

International Search Report for corresponding application PCT/EP2022/056710 filed Mar. 15, 2022; Mail date Jun. 21, 2022.
(Continued)

*Primary Examiner* — Bhavesh V Amin
(74) *Attorney, Agent, or Firm* — CANTOR COLBURN LLP

(57) ABSTRACT
An industrial machine (123) may not have a sensor for a particular parameter, so that a computer uses a neural network (473) to virtualize the missing sensor. The computer trains the neural network (373) to provide a parameter indicator ($Z'$) of a further process parameter (173, z) for the industrial machine (123) with steps that comprise receiving measurement time-series with historical measurement data from reference machines, obtaining transformation rules by processing the time-series to feature series that are invariant to domain differences of the reference machines, transforming time-series by using the transformation rules, receiving a uni-variate time-series of the further process parameter (z), and training the neural network with features series at the input, and with the uni-variate time-series at the output.

17 Claims, 9 Drawing Sheets

(56) References Cited

U.S. PATENT DOCUMENTS

| 2023/0273291 | A1* | 8/2023 | Ozturk | .................... | G01S 7/006 |
| | | | | | 342/52 |
| 2024/0152750 | A1* | 5/2024 | Schockaert | ........ | G05B 23/0221 |
| 2024/0337486 | A1* | 10/2024 | Gouge | .............. | G05B 19/4183 |
| 2024/0337487 | A1* | 10/2024 | Gouge | ................... | G01C 13/00 |
| 2024/0337506 | A1* | 10/2024 | Gouge | ................. | G01D 3/022 |

OTHER PUBLICATIONS

Li Xiang, "Diagnosing Rotating Machines with Weakly Supervised Data Using Transfer Learning", IEEE Transactions o Industrial Informatics, IEEE Service Center. Col. 16, No. 3 Jul. 8, 2019, XP011768054.

Li Xiang, "Domain generalization in rotating machinery fault diagnostics using deep neural networks", Neurocomputing, vol. 403, May 8, 2020, pp. 409-420, XP086193790.

Liao Yixiao, "Deep Semi supervised Domain Generalization for Rotary Machinery Fault Diagnostics Under Variable Speed", IEEE Translation on Instrumentation and measurement, vol. 69, No. 10 May 6, 2020, pp. 8064-8075, XP011808771.

Written Opinion of the International Searching Authority PCT/EP2022/056710 filed Mar. 15, 2022; Mail date Jun. 21, 2022.

Yongyi Ran, "A Survey of Predictive Maintenace Systems, Purposes and Approaches", Corenell University Library, Dec. 12, 2019, XP081559610.

Zhang Shen, "Deep Learning Algorithms for Bearing Fault Diagnostics—A Bearing Fault Diagnosticsx—A Comprehensive Review" IEEE Access, vol. 8, Feb. 10, 2020, XP011773320.

* cited by examiner 513 receive

2{{X1...XM}}N 523 transform to

2{{Y1...YM}}K 533 operate the trained network output indicator Z'

500

**3

452 transform

1{{{X1...XM}}N)

to

1{{Y1...YM}}K 462 receive

1{Z1...ZM}

472 train network with

1{{Y1...YM}}K and

1{Z1...ZM}

400

**2

411 receive

1{{X1...XM}}N)

2{{X1...XM}}N)

421 obtain rules

{{Y}}=f({{X}})

451 modify transformation rule 431 transform to

1{{Y1...YM}}K}

2{{Y1...YM}}K}

441 discrimi-nation fails?

Yes

No

**1

GENERATING VIRTUAL SENSORS FOR USE IN INDUSTRIAL MACHINES

TECHNICAL FIELD

In general, the disclosure relates to industrial production processes, and more particularly, the disclosure relates to computer systems, methods and computer-program products to emulate sensors and to emulate measurement data for process parameters of industrial machines that perform these processes.

BACKGROUND

Operating an industrial machine and simultaneously measuring its process parameters belong together. Measuring comprises to measure parameters that are directly related to the process that is ongoing in the machine, such as measuring temperature, pressure, sound, irradiance (as infrared camera reading), light reflection from surfaces, gas concentration, and other physical properties or phenomena. But measuring can also relate to process parameters that are indirectly related to the process, such as measuring physical properties of the materials that go into the machine or of the materials that leave the machine (that result from the process).

In that sense, the industrial machine is a machine under observation.

Further, process parameters can be differentiated by locations within the machine and outside the machine. For example, the temperature distribution can be measured at different parts of the machine.

From a more general view point, an industrial machine can be a machine that performs an industrial process. For example, the machine can be a chemical reactor, a metallurgical furnace, a vessel, an engine. More specifically, in view of the operating principle, the furnace can be a blast furnace. Much simplified, the blast furnace receives ores and coke, as well as hot air (via tuyeres) and provides molten metal.

Measuring is the main purpose of the sensors that are associated with the machine. For example, the machine can be equipped with temperature sensors. Such sensors can be implemented by thermometers, PT100 resistance temperature detectors or other types of temperature sensors.

It is well known that measurement results can be provided in at least two measurement modalities:

by sensors that are associated with the machine, and by interaction between a human operator and the machine.

In the example of the blast furnace, the sensors are distributed in various locations, and additionally, the operator usually takes samples of molten material. Simplified, the operator opens a part of the blast furnace hearth to extract the molten material (with a drilling machine, the step called tapping). The material then flows into a runner (called casting) and the operator can inspect the samples for chemical composition, temperature, appearance and the like.

Most of the measuring results turn into measurement data. Regarding data modality, measurement data can have different formats in various complexity, such as for example scalars for temperature or pressure, vectors for movement patterns of machine parts, matrices for images from surfaces, etc.

Measurement data is to be processed by one ore more computers. The computers can process the measurement data to obtain indicators for the operating state of the machine. Based on the measurement data and the indicators, the operator can modify operation parameters. For example, the mentioned sample taking may reveal insufficient temperature. Together with other data, the computer indicates to the operator that more coke should be charged into the furnace (the coke amount being an operation parameter).

In many other scenarios, the computer can act directly with the machine in the function of a process controller (e.g., control loop for the temperature parameter).

However, measurement data are not always available, for a number of reasons or constraints. Some of them deserve further attention:

A particular sensor may break, or the data connection to the computer may fail.

With different development stages of the machines, the distribution of sensors may differ from machine to machine, even if the machines are substantially of the same type. To stay with the furnace example, they are constructed individually or in very small series. The fleet of furnaces is therefore heterogeneous. Therefore, furnaces with the same operating principle (e.g., thermal regulation by coke charging and/or coal injection), same material (e.g., iron ore, coke) will nevertheless be different (e.g., in the volume). Such inter-machine differences may expose themself as lack of measurement data as well.

Human-machine interaction plays a role. There is a further technical problem involving potential danger or hazard to the operator. Opening the furnace for the mentioned sample taking should be limited to few occasions. Also, some measurements may become necessary during critical operation procedures of the furnace, such as measuring the temperature of molten material during casting. Human involvement in measuring should be minimized, so that the operator can fully concentrate on the operation of the furnace.

Some of these constraints appear in combination: an old-fashioned analog thermometer needs the operator to read the data, a digital thermometer does not.

Computers may calculate indicators for the operating state of the machine if the relations between measurement data is known. For example, a computer in a car may suggest the driver of the car to switch gears. However, in many cases, the relation between measurement data is too complex to be modelled by mathematical equations.

Using neural networks is an option. The network receives measurement data and provides the indicator. To put it simply, the network comprises so-called neurons that are arranged in a plurality of layers. Interconnection between the neurons is governed by so-called weights. The set of weights in a network can be called configuration.

However, the network needs to be trained (to set the weights and other network parameters). Again, in a simplified manner, training involves feeding historical measurement data into the network.

However, the historical data may not be available for a particular machine, especially in situations where machines do not have appropriate counterparts or peers. This lack of historical data is particularly prominent for machines (such as furnaces) that are manufactured at different development stages.

Further background information is available from the following papers:

LI XIANG ET AL: "Diagnosing Rotating Machines With Weakly Supervised Data Using Deep Transfer Learning", IEEE TRANSACTIONS ON INDUSTRIAL INFORMATICS, IEEE SERVICE CENTER, NEW YORK, NY, US, vol.

16, no. 3, 8 Jul. 2019 (2019-07-08), pages 1688-1697. The paper refers to data-driven machine diagnostics. There is a challenge in that training data for machines in a target domain is not available in sufficient quantity. It is however possible to use training data from multiple source domains instead. The paper explains an approach to adapt training data by transfer learning.

LI XIANG ET AL: "Domain generalization in rotating machinery fault diagnostics using deep neural networks", NEUROCOMPUTING, ELSEVIER, AMSTERDAM, NL, vol. 403, 8 May 2020 (2020-05-08), pages 409-420. The paper refers to data-driven machine diagnostics as well. There is a task to extract features that are domain-general or domain-invariant, the paper explains an approach that uses a domain adversarial network.

LIAO YIXIAO ET AL: "Deep Semisupervised Domain Generalization Network for Rotary Machinery Fault Diagnosis Under Variable Speed", IEEE TRANSACTIONS ON INSTRUMENTATION AND MEASUREMENT, IEEE, USA, vol. 69, no. 10, 6 May 2020 (2020-05-06), pages 8064-8075. The paper refers to rotating machinery and the use of neural networks to detect faults. However, labelled training data is available for one rotation speed, but not for a different speed. Nevertheless—by using a Wasserstein Generative Adversarial Network—it is possible to overcome that challenge.

SUMMARY OF THE INVENTION

An industrial machine operates with a plurality of process parameters, but the industrial machine may not have an appropriate sensor to a particular parameter, or measurement data for that process parameter may not be available for other reasons. A neural network provides a parameter indicator that corresponds to a process parameter in the machine. The network has been trained based on historical data from the reference machines. At least one of the reference machines—the source reference—has a sensor for that process parameter.

The reference machines are different, and in terms of machine learning, they belong to different domains. The training therefor involves transfer learning, or more precisely unsupervised domain adaptation.

By performing a computer-implemented method, the computer trains a neural network to enable the network for later processing a multi-variate measurement time-series with measurement data. The measurement data represent instances of particular process parameters of an industrial machine. The trained network is trained to provide a parameter indicator of a further process parameter for the industrial machine.

In a first receiving step, the computer receives a first multi-variate measurement time-series with historical measurement data from a first reference machine and receives a second multi-variate measurement time-series with historical measurement data from a physically different second reference machine.

In an obtaining step, the computer obtains a set of transformation rules, by processing the first and second multi-variate measurement time-series, such that the transformation rules enable a transformer module to transform the first and second multi-variate measurement time-series into first and second multi-variate feature time-series, respectively. The multi-variate feature time-series are invariant to domain differences of the first and second reference machines.

In a transforming step, the computer transforms the first multi-variate measurement time-series to a first multi-variate feature time-series by the transformer module that applies the transformation rules.

In a second receiving step, the computer receives a uni-variate measurement time-series with measurement data of the further process parameter, from the first reference machine.

In a training step, the computer trains the neural network with the first multi-variate feature time-series at the input of the network, and with the uni-variate measurement time-series at the output of the network.

Optionally, the computer can obtain the set of transformation rules by, in repetitions: transforming the first multi-variate measurement time-series to a first multi-variate feature time-series, and transforming the second multi-variate measurement time-series to a second multi-variate feature time-series, using a set of preliminary transformation rules; discriminating, by a discriminator module the origin of the first and second feature time-series, as the first and second multi-variate measurement time-series; modifying the set of preliminary transformation rules, until the discriminator can no longer discriminate the data origin.

Optionally, the computer can use a discriminator module that determines that is can no longer discriminate the data origin by operating until an adversarial loss reaches a maximal value.

Optionally, the computer can repeat the obtaining step for the transformation rules and the training step, wherein the transformer module further receives network loss provided by the neural network under training so that the repetition stops for minimal network loss.

Optionally, the combination of the transformer module and the discriminator module operates as a generative adversarial network.

Optionally, the computer performs the method steps receiving multivariate measurement time-series, obtaining the set of transformation rules, transforming and training the neural network for multi-variate measurement time-series for that the variates have been determined to be related to the further process parameter by a data selector module.

Optionally, the data selector module is being trained by a selector trainer module that causes the computer to repeat the method steps obtaining, transforming and training, with the criterium to minimize a loss function during the training of the neural network.

Optionally, the computer performs receiving the first and second multi-variate measurement time-series with historical data, after adapting the data modality of the measurement data.

Optionally, the computer can adapt the data modality by at least one of the following: analyzing measurement data with sound samples by classifying the sound samples to categories, and analyzing measurement data with images by classifying the images to categories.

Optionally, the computer repeats adapting for different goals, with goals being selected while minimizing the loss function during the training of the neural network.

Optionally, the computer uses a neural network that is a regression neural network.

Optionally, the measurement data are related to process parameters that are physical properties, selected from the following: temperature, pressure, chemical composition of materials within the machine, visual appearance of a part of the industrial machine, and sound emitted by the industrial machine.

Optionally, the industrial machines are selected from chemical reactors, metallurgical furnaces, vessels, and engines.

Once the neural network has been trained, the computer (or a physically different computer) can perform a computer-implemented method for operating the neural network, with receiving a multi-variate measurement time-series with measurement data for an industrial machine under observation; transforming the multi-variate measurement time-series to a multi-variate feature time-series, and operating the network to provide the parameter indicator.

Optionally, operating the neural network occurs in situations selected from the following: sensor failure, data connection failure, minimization of human involvement for measuring.

A computer program product that, when loaded into a memory of a computer system and executed by at least one processor of the computer system, causes the computer system to perform the steps of a computer-implemented method.

A computer system comprising a plurality of computer-implemented modules which, when executed by the computer system, can perform the steps of a computer-implemented method. Or from a different point of view: the computer system performs the steps of the computer-implemented method.

Further, there is the use of a computer performing a method, acting as a virtual sensor to obtain the parameter indicator that represents a parameter of an industrial machine.

BRIEF DESCRIPTION OF THE DRAWINGS

Embodiments of the present invention will now be described in detail with reference to the attached drawings, in which.

DETAILED DESCRIPTION OF EMBODIMENTS

Writing Conventions in Overview

Figure 1:
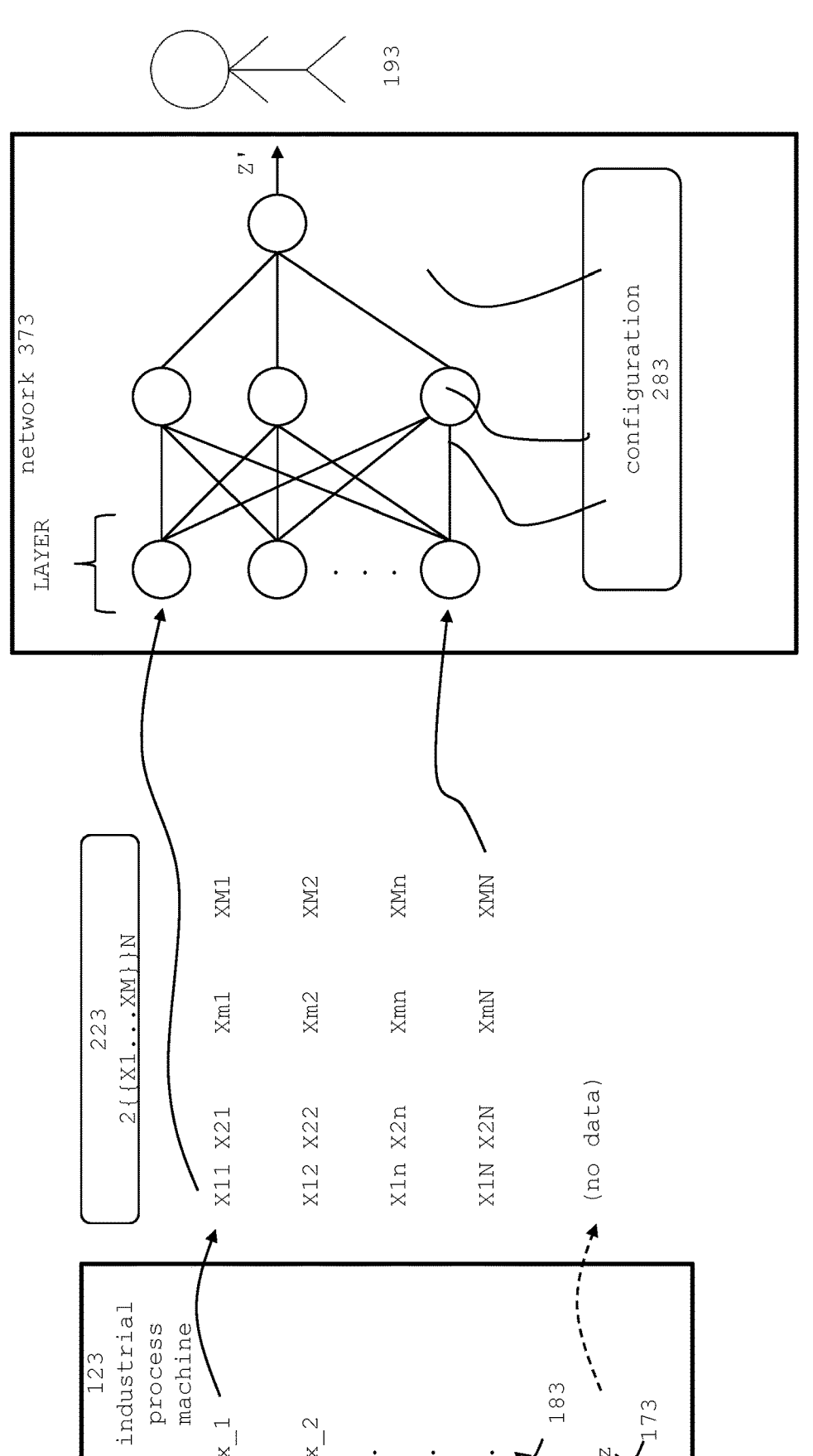
FIG. 1 illustrates an industrial machine with multi-variate measurement time-series as well as a neural network with a configuration, to explain writing conventions.

FIG. 1 illustrates industrial machine 123 with multi-variate measurement time-series 223 as well as neural network 373 with configuration 283, to explain writing conventions.

The figure also illustrates—although symbolically only—that industrial machine 123 performs an industrial process with process parameters 173/183. The process parameters can be split into two groups:

measurement parameters 183 (or x-parameters) and non-measurement parameter 173 (or z-parameter, at least one).

The attribute "measurement" is related to particular industrial machine 123, in the sense that measurement data goes into multi-variate measurement time-series 223 for that machine 123.

For at least one process parameter z, measurement data is missing (i.e., not available). In principle, parameter z is a measurable parameter, but data is not available. The output of neural network 373 provides parameter indicator Z' that is a representation of that particular process parameter z. Parameter indicator Z' could be considered as an "artificial measurement value" or as artificial or virtual measurement data. Or in other words, the computer emulates the sensor.

Parameter indicator Z' could serve as a status indicator for machine 123 (Z' indicating the status), or Z' could serve as an input variable for a computer or other module that determines the machine status (Z' being one contributor to the status). The description focuses on calculating Z'.

For (human) operator 193 of industrial machine 123, network 373 appears like a virtual sensor that outputs parameter indicator Z'. In theoretical and ideal situations, indicator Z' would represent physical reality as a real sensor (hardware sensor, physical sensor) would do.

In practical non-ideal situations, the accuracy of parameter indicator Z' (calculated by network 373) would be defined as the difference of indicator Z' from network 373 to measurement data Z from an appropriate hardware sensor.

Figure 5:
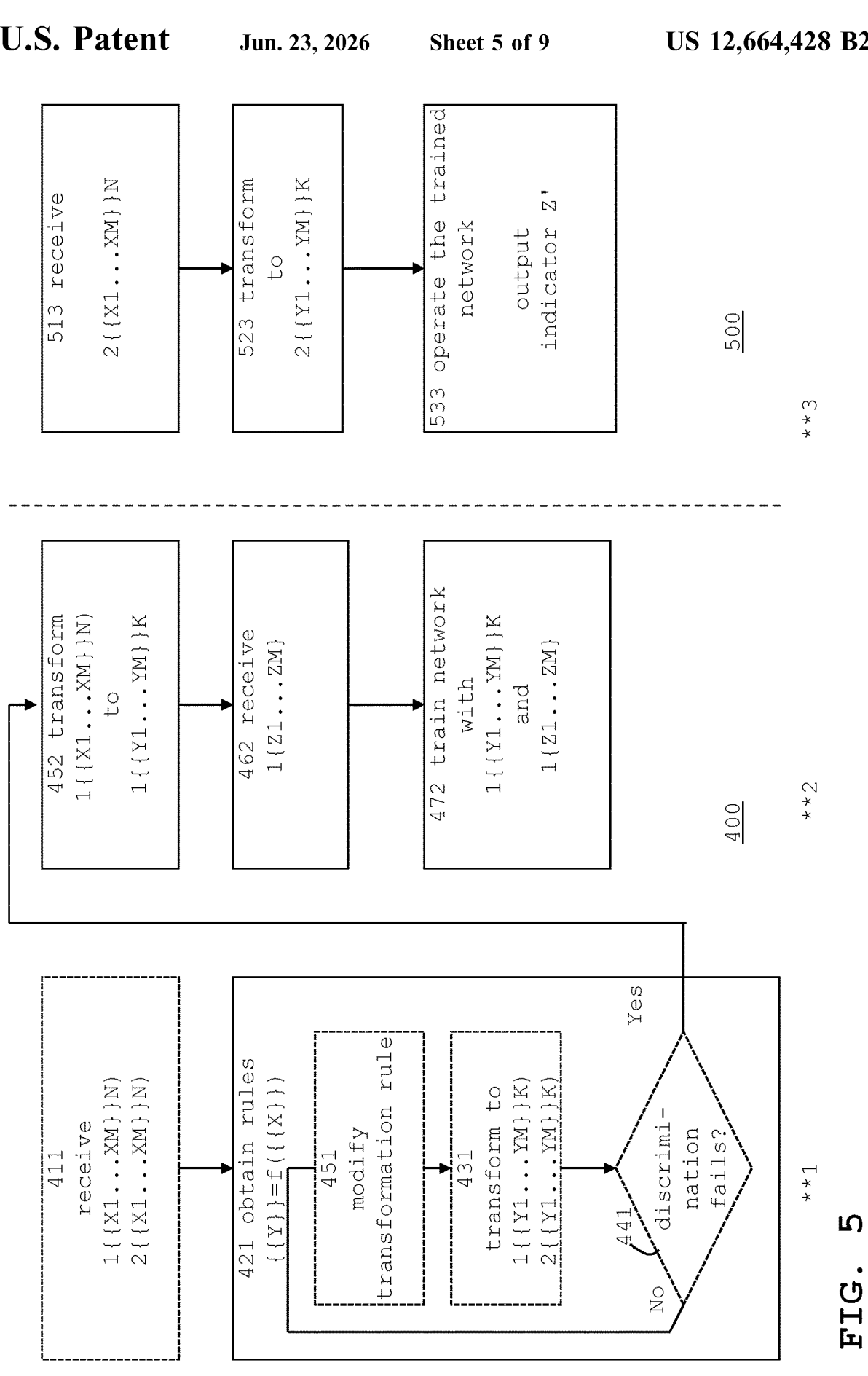
FIG. 5 illustrates flowcharts of method to a train neural network and of a method to use the network during the operation of the industrial machine.
Figure 6:
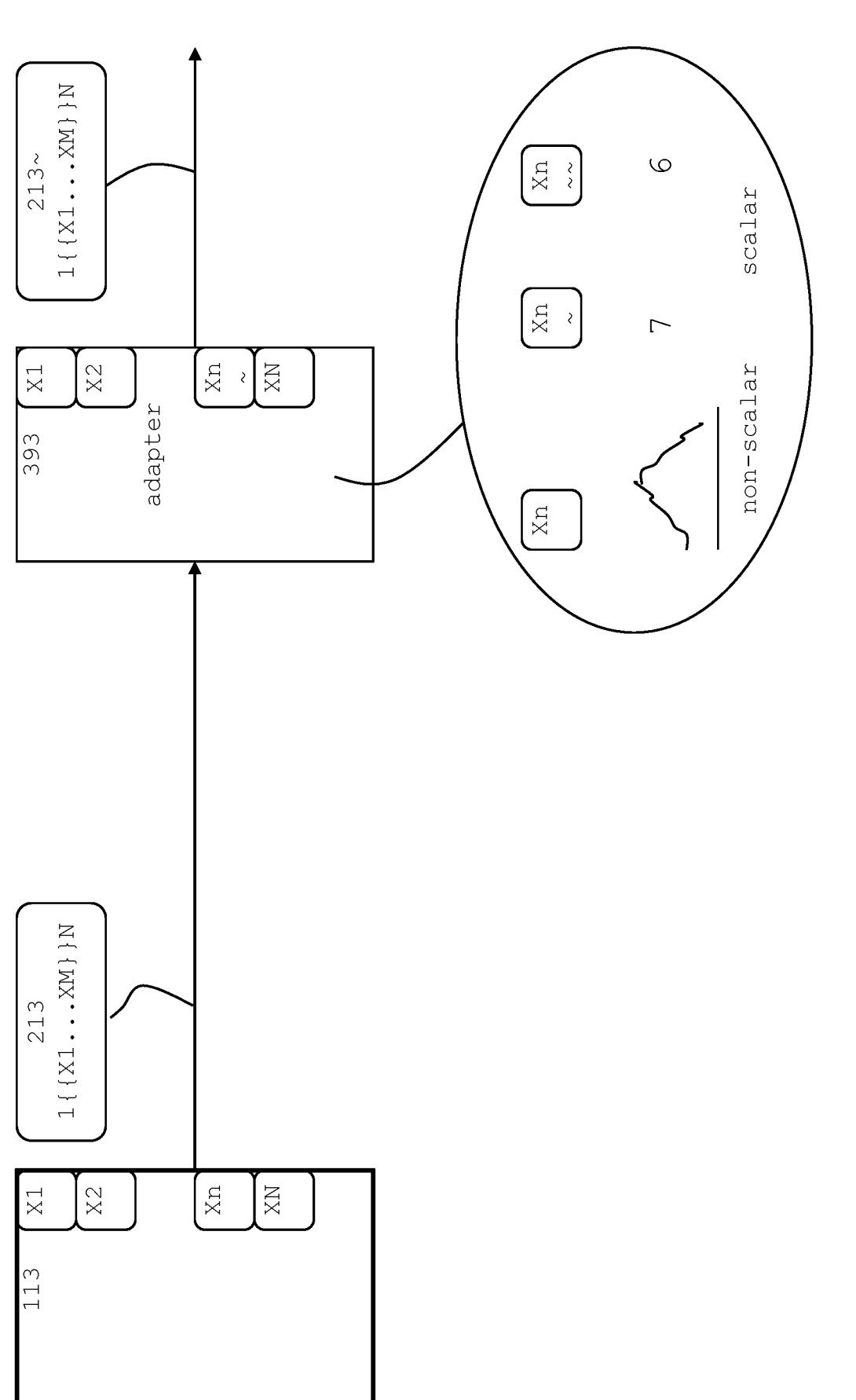
FIG. 6 illustrates an optional modality adapter module that implements an optional modality adaptation of measurement data.
Figure 7:
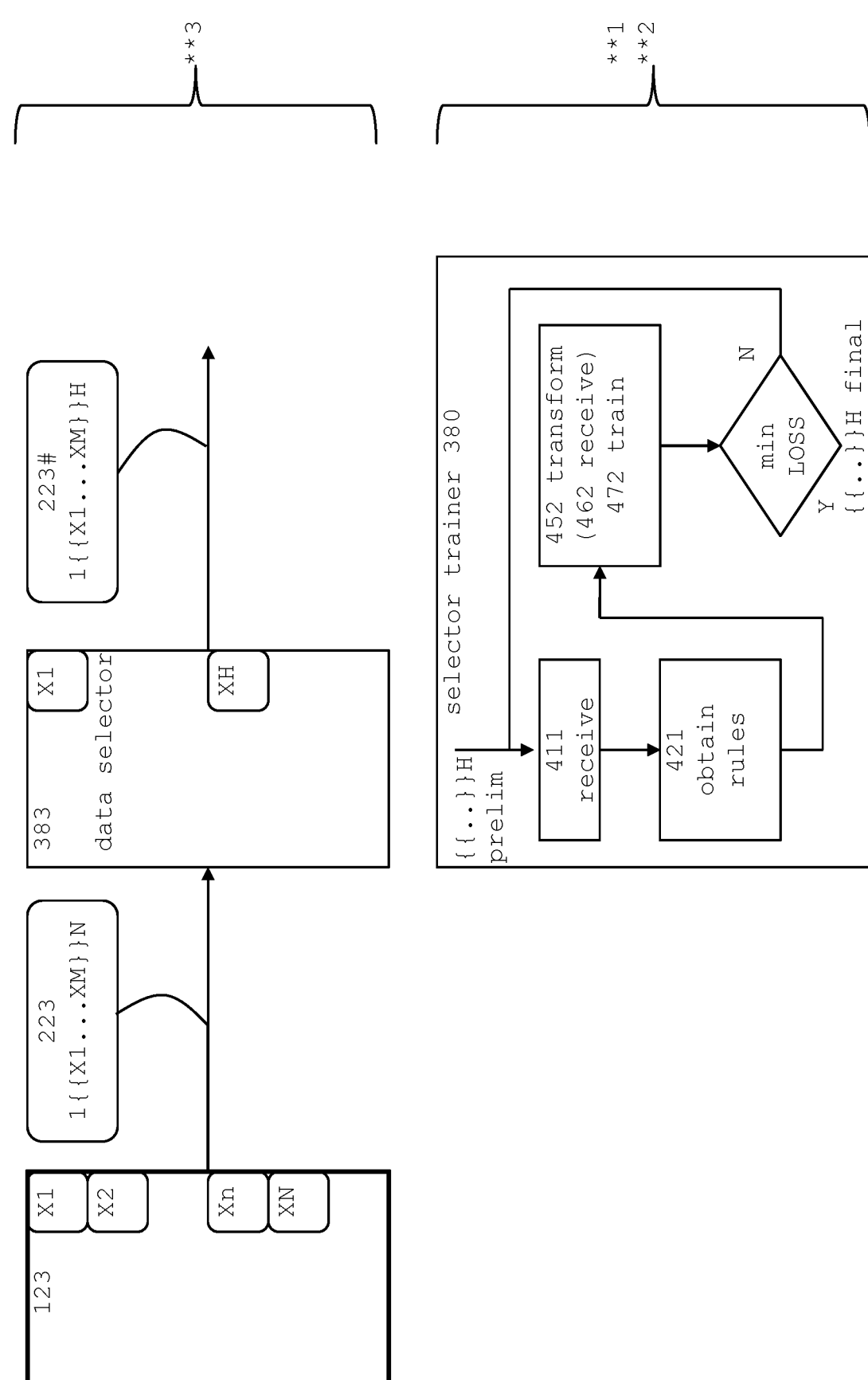
FIG. 7 illustrates an optional data selector module that optionally implements a selection of relevant measurement data.

The description explains an approach to determine Z' (FIGS. 1-5) and will explain optional measures to increase the accuracy in connection with (FIGS. 6-7).

Industrial machine 123 (or industrial equipment) is a machine that continuously performs industrial processes. While the description has mentioned examples above, the description focuses on the example of machine 123 being a blast furnace.

In view of this blast furnace example, the process parameter z could be the temperature of the molten material. There is no direct measurement value available (temperature sensor missing or other reason, as introduced above), but parameter indicator Z' provides a calculated value. Z' could be further processed to a status indicator (for example, if the furnace is ready for casting because the temperature and other criteria allow that).

To allow network 373 providing Z', some method steps need to be executed in advance, including machine learning. For convenience, the description explains the steps in the context of phases. The description may differentiate components being active during the preparation phase 1 (cf. FIG. 2), the training phase 2 (cf. FIG. 3), and the operation phase 3 (cf. FIG. 4). In other words, throughout this description, references noted as 1/2/3 stand for components that are similar but that are different in these phases. For example, machine 121 in FIG. 2 and machine 123 in FIG. 4 is physically the same machine but operates as a reference machine (or as a machine under observation/supervision).

The description differentiates phases **\*\*1/\*\*2/\*\*3 in view of the network (that provide the parameter indicator Z'). From that perspective, training occurs in phase \*\*2**.

However, there can be other training loops:

Preparation phase **\*\*1 can optionally include a training loop (cf. FIG. 5 with a repetition loop for sub-steps in obtaining rules 421**).

Training can also be applicable for a modality adaptation (cf. FIG. 6), with loops over **\*\*1 and \*\*2**.

A further training loop can be applied at larger time granularity in that some steps of **\*\*1 and \*\*2 are repeated (cf. FIG. 7**).

A still further training loop can be applied to train the discriminator and the transformer, by including the network loss LOSS as a parameter.

Process parameters to be measured (or at least to be emulated) will be given by lower-case letters, such as "x" or "z" (symbolized on the left side within machine 123).

The figure illustrates this for parameters x_1 (could be temperature at a particular location inside the machine, e.g., the upper part) and x_2 (for example, the temperature at a different location, the lower part). There are N process parameters {x_n}N and at least one further parameter z. The underscore "_" is a placeholder.

Measurement data is given by upper-case letters, such as X or Z. Parameter indicator Z' is indicated with the prime (') symbol because it stands for de-facto measurement data, or artificial measurement data.

The uppercase convention also applies for intermediate data "Y" (or "feature data", not measured, no output data).

Time-Series

Data (measurement data, intermediate data) can be available in the form of time-series, i.e., series of data values indexed in time order for subsequent time points.

The figure introduces time-series by a short notation (rectangle 223) and by a matrix.

The notation {X1 . . . XM} stands for a single (i.e., uni-variate) time-series with measurement data element Xm (or "elements" in short). The elements Xm are available from time point 1 to time point M: X1, X2, . . . , Xm, . . . XM (i.e., a "measurement time-series"). Index m is the time point index. Time point m is followed by time point (m+1), usually in the equidistant interval $\Delta t$.

An example is a temperature increase over M time points: {1400° C. . . . 1500° C.}. The person skilled in the art can pre-process data values, for example, to normalized values [0,1], or {0.2 . . . 1}. The format of measurement data is not limited to scalars or vectors, {X1 . . . XM} can also stand for a sequence of M images taken from time point 1 to time point M. In case of the machines being blast furnaces, the images can be taken from inside the tuyeres of the furnace, or from the direct environment of the blast furnace. Images would be taken to detect anomalies.

The notation {{X1 . . . XM}}N stands for a multi-variate time-series (in FIG. 1, reference 223 above the matrix) with data element vectors {X_m}N from time point 1 to time point M. The vectors have the cardinality N (number of variates, i.e., process parameters for that measurement data is available), that means at any time point from 1 to M, there are N data elements available. The matrix indicates the variate index n as the row index (from x_1 to x_N).

For example, the single time-series for the temperature can be accompanied by a single time-series for the pressure, for measurement data regarding chemical composition of materials, or the like.

The person of skill in the art understands that the description is simplified. Realistic variate numbers N can reach and exceed a couple of 1000. Time-series are no ideal. Occasionally, an element is missing, but the skilled person can accommodate such situations.

The selection of the time interval $\Delta t$ and of the number of time points M depends on the process. The overall duration $\Delta t*M$ of a time-series (i.e., a window size) corresponds to the process parameter shift that takes the longest time. For example, it takes a furnace a couple of hours to process the materials so that $\Delta t*M$ is selected accordingly.

Intervals $\Delta t$ are conveniently selected in the range between 1 and 60 minutes, and $\Delta t*M$ is conveniently selected in the range between 4 hours and 24 hours. The example of the blast furnace may apply $\Delta t=15$ minutes and M=32, corresponding to an 8-hour working shift.

As time points tm specify the time for processing by the network, some measurement data may be pre-processed. For example, a temperature sensor may provide data every minute, but for $\Delta t=15$ minutes, some data may be discarded, averaged over $\Delta t$, or pre-processed otherwise.

As data can originate from different industrial machines, the data origin is occasionally indicated by a 1, 2 etc. in front of the { }, or {{ . . . }}. In the example of the figure, 2{{ . . . }} indicates that the multi-variate time-series comes from machine 123.

As it will be explained, the computer applies an X-to-Y transformation. The resulting values can be multivariate time-series as well. Cardinalities are given by K.

References

As used herein, references **1\*\* point to the industrial machine in the real world (physical world), references 2\*\* point to data (such as the configuration 283), references 3\*\* point to hardware and to computer-implemented modules (such as to neural network 373); and references 4\*\* or 5\*\* point to method steps (cf. FIG. 5**).

Computers

The notation "the computer" (in singular, without reference) stands for a computing function or for a function of a computer-implemented module (such as processing units, are time-shared resources of such units). The functions can be distributed to different physical computers, wherein the computer-implemented modules would be distributed to such different computers.

The figures also illustrate a computer program or a computer program product. The computer program product—when loaded into a memory of a computer and being executed by at least one processor of the computer—performs the steps of a computer-implemented method. In other words, the program provides the instructions for the modules.

From a different perspective, the figures illustrate the modules of a computer system comprising a plurality of computer-implemented modules which, when executed by the computer system, perform the steps of the computer-implemented method. The industrial machines are not considered as computer-implemented modules.

Machine Learning Tool and its Configuration

The figure also symbolizes neural network 373 with neurons (circle symbols) arranged in layers (neurons in one vertical line). Neural network 373 is an example for a machine learning tool. Some of the other modules described herein use machine learning as well.

There are two basic descriptors for such networks:

the set of hyperparameters and the configuration.

Hyperparameters define mathematical functions to be performed by the neurons (e.g., summing up weighted input and applying a threshold, or other functions), define functions that are performed by neurons in combinations (e.g., the selection of kernel functions, between convolution kernels, Gauss kernels etc.), define the arrangement of neuron in layers and the interconnection between the layers (e.g., full connection between layers as in the example between the first and second layers).

Hyperparameters are described in the art, usually as network architecture. Hyperparameters are not being trained.

Configuration 283 defines the weighted data transmission from neuron to neuron, and defines bias (or offset) values for the neurons. Configuration 283 is obtained by training.

Neural network 373 is illustrated here only as an example. FIGS. 6-7 illustrate further tools (such as to adapt data modality, select relevant data, data transformers) for that the architecture and configuration conventions apply as well.

Domain Differences Between Machines

Industrial machine 123 (FIG. 1) is not the only available machine for that measurement data. Other industrial machines for that measurement data are available as well, hereinafter the "peer machines". Peer machines operate according to the same principle, but can differ in some aspects.

Regarding such differences, the industrial machines can be regarded as belonging to first and second domains.

One of the peer machines can supply additional measurement data to train the network. The description refers to machine 111/112 being the source (providing real measurement data Z for parameter z) and to machine 123 being the target (for that the network calculates indicator Z'). A peer machine providing data for training is also called "reference machine". Both the source machine and the target machine are reference machines in the sense that both can provide measurement data used in the preparation phase **\*\*1. One of them (the source machine) has a sensor that the other does not have (the target machine). The source machine is the source of data used in the training phase \*\*2**.

The domain differences between reference machines are characterized by different operational modes. Such differences in operation are induced by different parametrization of the machines, or by different environments impacting the underlying process operated by the machine.

To stay with the blast furnace example, two peer machines process the same metal, use the same materials (such as ore and coke), have sensors at comparable locations, for the same parameters and so on.

But there are differences: a first furnace may be larger than a second furnace (size difference) or the furnaces may have slightly different shape, resulting in slightly different measurement values, such as in the volume of molten material, the time to melt, and so on. The size difference is prominent in furnaces that have different heights (cf. FIG. 8 for an example).

The domain differences cause different measurement data for the same equivalent parameters.

Also, domain differences are the result of applying different measurement methods.

Due to the domain differences, the computer applies data transformation.

To give an illustrative example, let us briefly refer to music. Both organ pipes and blast furnaces generate sound from moving air. Longer organ pipes play at lower frequencies than shorter organ pipes. But human listeners have learned to recognize melodies, that means sequences of tones with different relative frequencies. Melodies are invariant to absolute frequencies.

As sounds from the furnace can be used as measurement data, the transformation separates out the melody from the pitch. In other words, an appropriately adapted transformer may receive two time-series $1\{X1 \ldots XM\}$ and $2\{X1 \ldots XM\}$ from first and second furnaces and provide melodies (domain invariant) that can be further processed (such as by comparison).

Data Modality

For simplicity of explanation, the description initially assumes that measurement data have the same data modality. Measurement data in time-series are assumed to comprise scalars only. Optional modality adaptation will be discussed with FIG. 6.

Relevance to Determine Parameter Indicator Z'

For further simplicity of explanation, the description initially also assumes that all parameters $x\_1$ to $x\_N$ may influence parameter z. Therefore, the computer processes them all. Optionally, relevant differences can be taken into account, the description will explain details with FIG. 7.

Steps to Generate the Configuration

In the following, the description explains steps that one or more computers execute to obtain the configuration. The description of the figures follows the sequence of steps. It is however convenient to have an overview to FIGS. 2-4 starting from the end.

During its operation (cf. FIG. 4), industrial machine 123 provides measurement data to neural network 373 that provides parameter indicator Z'.

Network 373 can provide Z' because:

Configuration 283 has been obtained before in the training phase (FIG. 3), by processing historical measurement data that is substantially complete (with data for z), but originates from an industrial machine 112 (for which the appropriate data for z is available). In more detail, time-series 212 and 272 includes common measurement data $1\{\{X1 \ldots XM\}\}N$ and further data $1\{Z1 \ldots ZM\}$.

Although network 373 with configuration 283 can not directly process measurement time-series 223 with data $2\{\{X1 \ldots XM\}\}N$, transformer 323 transforms time-series 223 with data $2\{\{X1 \ldots XM\}\}N$ into intermediate time-series 243 $2\{\{Y1 \ldots YM\}\}K$.

Figure 2:
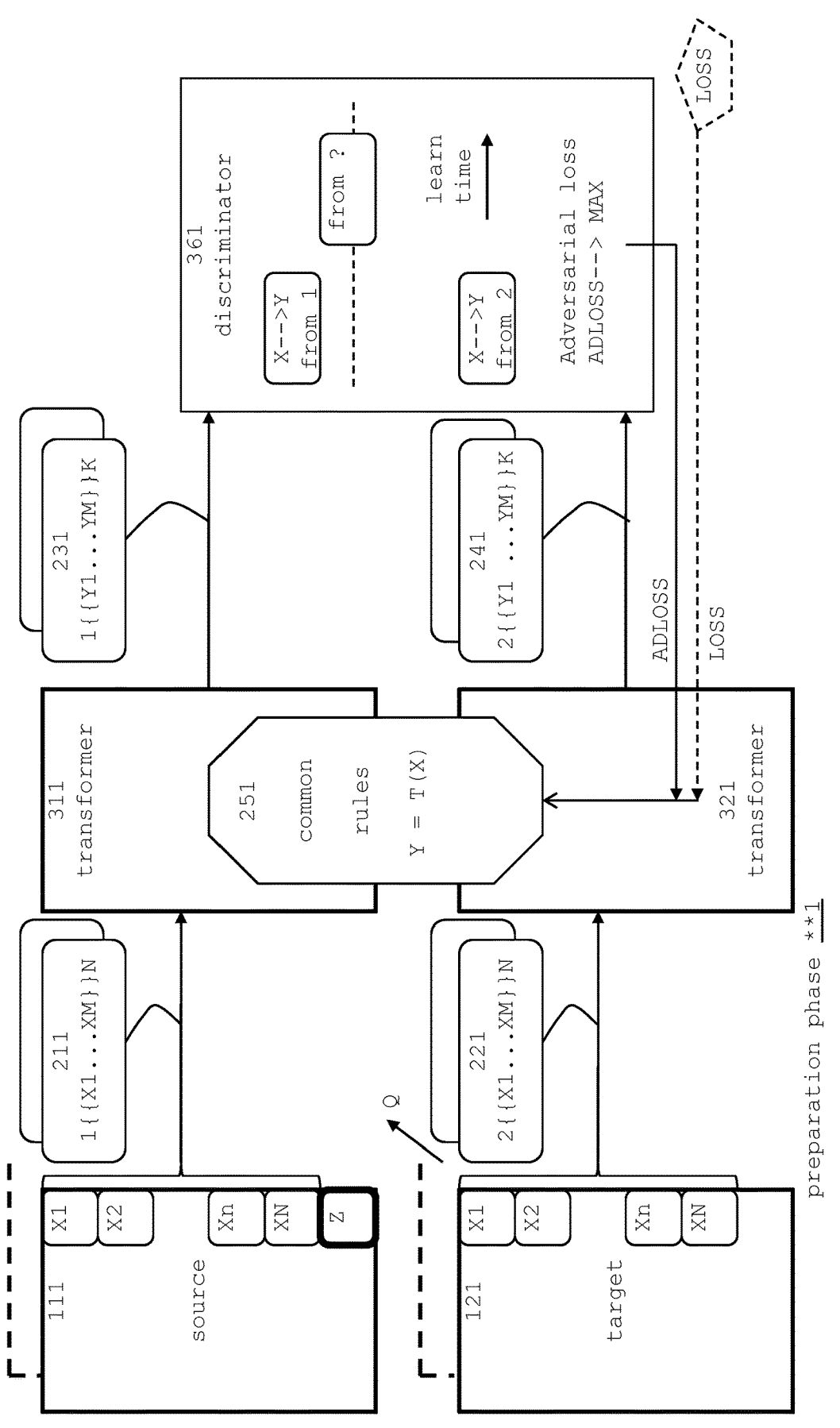
FIG. 2 illustrates industrial machines and computer modules in a preparation phase, to obtain a set of transformation rules.

Transformer 323 can provide intermediate time-series 243 because:

During the preparation phase [cf. FIG. 2), a predecessor 311/321 of transformer 323 has been configured to transform time-series $\{\{X1 \ldots XM\}\}N$ to intermediate time-series $\{\{Y1 \ldots YM\}\}K$.

The configuration of the transformer 311/321 has been accomplished by discriminator 361 that optimizes common transformation rules so that the intermediate time-series are no longer specific to domain-differences between physically different machines 111 and 121.

Training network 372 to obtain configuration 283 (cf. FIG. 3) is possible because:

The network under training can receive historical measurement data (from a peer machine, here from machine 112) because transformer 322 can convert that data. There is no need to transform time-series $1\{Z1 \ldots ZM\}$.

Origin of Measurement Data

Figure 3:
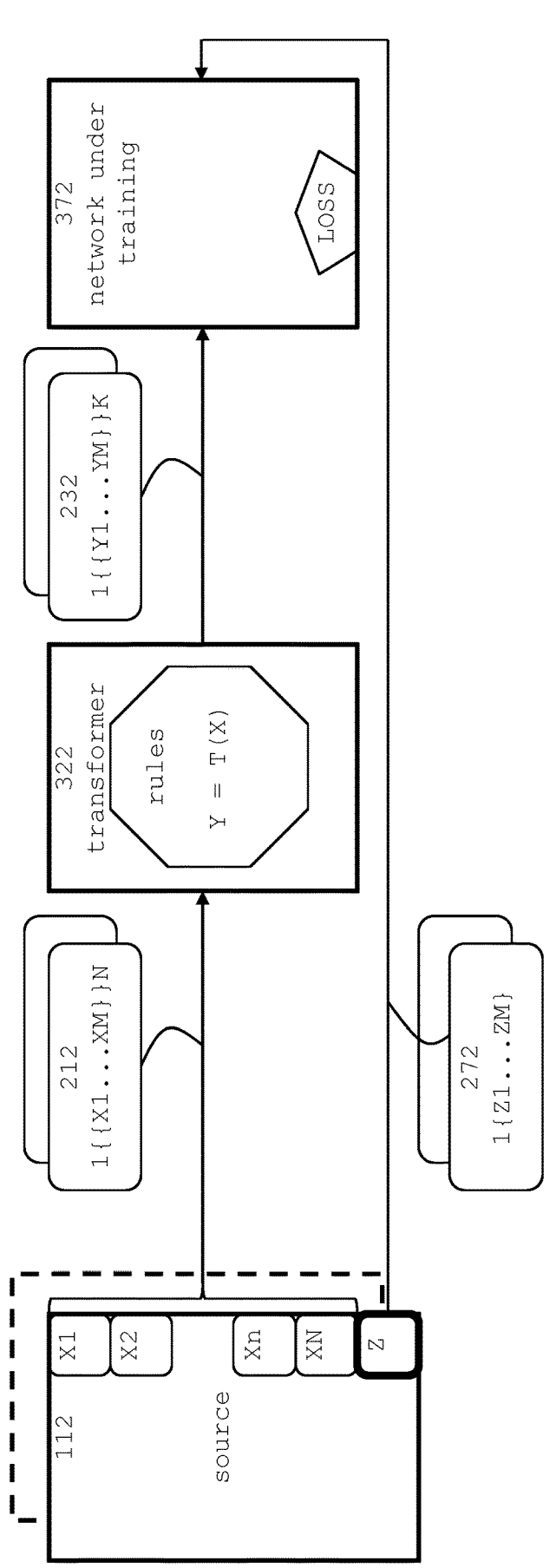
FIG. 3 illustrates a reference industrial machine, a transformer module and a network under training during a training phase.
Figure 4:
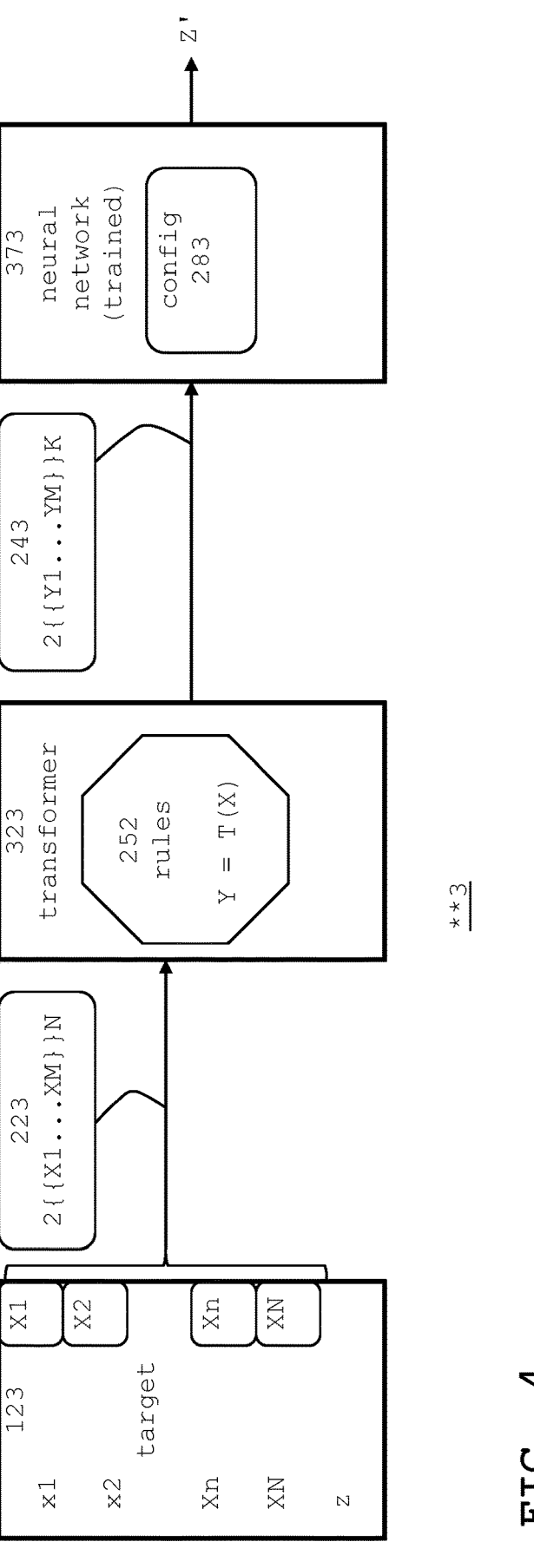
FIG. 4 illustrates the industrial machine of FIG. 1 and the transformer module of FIG. 3 during an operation phase to provide a parameter indicator.

To keep the illustration simple, FIGS. 2-4 show measurement data coming from sensors. However, some measurement data could also arrive via human-machine interfaces or the like. For convenience, the sensors are referenced as the measurement data that they provide: X1 . . . XN, also Z, in small round-shaped square symbols.

FIG. 2 illustrates industrial machines and computer modules in preparation phase **\*\*1 to obtain (421**) a set of transformation rules.

Industrial machines 111, 121 each have sensors X1 to XN (common sensors because they provide data for common process parameters). Machine 111 has sensor Z (illustrated in bold) to provide uni-variate measurement time-series 211 $1\{\{X1 \ldots XM\}\}N$, but machine 121 does not have such sensor.

Information measurement data Z will be "exchanged" between peers, not directly, but during the establishment of rules. Machine 111 is the "source" and machine 121 is the "target". Machine 111 is the only machine with sensor Z.

Parameters Equivalence

The process parameter xn is available in both reference machines ($1xn$ for the source and $2xn$ for the target, cf. the matrix in FIG. 1). For example, both machines have the temperature parameter for the upper part of the furnace. The process parameter x(n+1) is also available in both machines, for example, being the temperature for the lower part.

In other words, process parameters that are available in both reference machines are equivalent parameters. Equivalent parameters are marked by equal variate index n.

Equivalent parameters lead to equivalent measurement data.

Sensor Xn of machine 111 ("source") and sensor Xn of machine 121 ("target") are equivalent as the resulting measurement data refers to the same parameter, for example, both are temperature sensors in the upper part. Sensor Xn of machine 111 and sensor X(n+1) of machine 121 are not equivalent.

A parameter is singular (e.g., temperature at the upper part), but measurement data is plural (e.g., two furnaces).

Sensor Equivalence

Sensors of different machines that provide measurement data for equivalent parameters are equivalent sensors. Equivalent sensors do not have to operate according to the same principle.

For example, sensor Xn (of source) and Xn (of target) both provide the top gas temperature. Xn (source machine) does this by an invasive approach (moving a bar with attached sensors above the burden) and Xn (target machine) by sound transmitters and receivers above the burden (i.e., above the furnace charge).

Historical Data

In general, training a machine learning tool (such as the network) requires historical data. The operation of transformer 311/321 starts with receiving multi-variate measurement time-series 211, $1\{\{X1 \ldots XM\}\}N$) with historical measurement data from reference machine 111, and second multi-variate measurement time-series 221, $2\{\{X1 \ldots XM\}\}N$) with historical measurement data from a physically different second reference machine 121.

Although the figure illustrates receiving by arrows, the person of skill in the art will store the time-series in databases. There is no need for further explanation herein.

However, feeding $\{\{X1 \ldots XM\}\}N$ into a tool that is being trained (such as transformer to learn rules) alone is not sufficient for M*N data elements (cf. the matrix in FIG. 1). There are two options:

First, historical data could come from multiple physical machines 111/112 (not from two machines only but from many more). This option is just symbolized by the dashed repetitions of the boxes. In practical terms (heterogeneous fleet) such an approach is however not available to furnaces.

Second, physical machines 111/112 provide data in repetitions. The second option is preferred.

FIG. 2 illustrates multiple $\{\{ \ldots \}\}N$ (and also $\{\{ \ldots \}\}K$) by two round-shaped rectangles (in overlay fashion). The figure also illustrates an arrow Q. A further notation would be $\{\{\{ \ldots \}\}\}$ Q.

Q is the number of multi-variate measurement time-series. It is convenient to have equal Q for all machines. In practical terms this however not always possible. A machine might be "younger" (Q smaller) than its peer machine (Q larger).

To stay with the above-introduced example, $\Delta t*M=8$ hours, a machine would have collected Q=3*365 multi-variate measurement time-series over a year. In other words, Q can have a magnitude of 1000 per year. There is no need to take all available data into account. Sometimes the machine may be in maintenance or repair mode so that historic measurement data would not be available.

The 8-hour time slot is convenient for illustration. The computer can however apply a window slot T_WINDOW to compute the features of the multi-variate time-series. Such a window slot can be defined as a moving time window with the duration of several hours (e.g., 8 hours). The window slot can move over the data collected over a longer period (e.g., over a year) with an overlap (T_OVERLAP). Convenient relations between T_WINDOW and T_OVERLAP are, for example, T_WINDOW>T_OVERLAP (or even equal). Having T_WINDOW in the order of 6 to 10 hours is convenient, with T_OVERLAP in the between 1 and 3 hours.

Removing Domain Differences from Historical Data

Despite the mentioned equivalences (in parameters, sensors), historical data still reflect domain differences.

The computer obtains (step 421 in FIG. 5) a set of transformation rules 251 (in FIG. 2)/252 (in FIG. 4) by processing the multi-variate measurement time-series 211 and 221. Transformation rules 251/252 enable transformer 311/321 to convert multi-variate measurement time-series 211, 221 ($\{\{ \ldots \}\}$) into multi-variate feature time-series 231 and 241, respectively. These feature time-series $1\{\{Y1 \ldots YM\}\}K$ and $2\{\{Y1 \ldots YM\}\}$ are invariant to the domain differences of reference machines 111/121.

In other words, the domain-invariant features have been extracted.

Using multiple multi-variate measurement time-series (cf. Q) is just mentioned, the transformation does not change that.

Transformer 311/321 is illustrated here by two boxes, because time-series 211 is transformed to time-series 231, and time-series 221 is transformed to time-series 241. It does not matter if the transformation is performed in parallel (as in the figure) or serially. Both transformers use the common rules 251/252.

The rules are obtained by training. There is no need for involving a human expert herein. In other words, the domain adaptation (having features instead of measurement data) is unsupervised. Using expert annotations or labels are not required. Optionally, the expert can define some rules manually, based on existing expert knowledge. Defining some rules manually can further ensure the convergence of the training.

Transformation Rules

As the network has been trained with training data from different domains, transfer learning is involved.

Simplified, there is a transformation that converts the first and second multi-variate measurement time-series 211, 221 into first and second multi-variate feature time-series 231, 241, respectively. The multi-variate feature time-series 231, 241 are invariant to domain differences of the reference machines 111, 121.

In other words, transformation extracts features that are no longer domain specific. The measurement time-series can be regarded as belonging to first space (or input space) and the feature time-series can be regarded as belonging to a second space (or feature space). The input space is sensitive to domain differences, the feature space is not.

There is an assumption of a causal relation between space X and the space Y that represents a continuous space for regression.

The marginal distribution in both domains (source=s, target=t) are similar: ps(ys|T(xs))≈pt(yt|T(xt)) where ys is the output data in the source domain ("s"), and yt is the output data in the target domain ("t").

The transformation rules follow the principle Y=T(X). In more detail, transformers 311, 321 operate according to the time intervals Δt: transformer 311 transforms data vector 1{X1}N to data vector 1{Y1}K, and transformer 321 transforms data vector 2{X2}N to data vector 2{Y2}K for t=1. Next, they transform 1{X2}N to 1{Y2}K and 2{X2}N to 2{Y2}K for t=2, and so on until t=M.

As the variates of {{X1 . . . XM}} N are not necessarily identical with the variates of {{Y1 . . . YM}}K, the transformation can change the variate cardinality (usually N>K).

Although the transformation rules are introduced here for operations with data at tm (vertically, processing data vectors for time intervals tm), the rules can optionally be expanded to process data from predecessor time points (m−1), (m−2) and so on. The skilled person is familiar with such recurrent networks.

As transformation has been described in the art, the skilled person can select from existing transformation schemes.

For convenience, the following further papers are mentioned:

Hochreiter, et al, "Long Short-Term Memory", in Neural ComputationNovember 1997, https://doi.org/10.1162/neco.1997.9.8.1735 (1997)

Ashish Vaswani et al, "Attention Is All You Need", Advances in Neural Information Processing Systems 30, NIPS 2017, (2017)

Anastasia Borovykh, et al, "Conditional Time Series Forecasting with Convolutional Neural Networks", arXiv:1703.04691 (2017)

Aaron van den Oord, et al., "WaveNet: A generative model for raw audio", arXiv:1609.03499, (2016).

Features for multimodal multi-variate time series are extracted by an algorithm such as but not limited to, recurrent neural network (Hochreiter) potentially combined with convolutional neural networks, or transformers (Vaswani) or wavenet (Borovykh, van den Oord).

The transformation function T can be identified by minimizing the dissimilarity between both class-conditional distributions ps(t(xs)|ys)≈pt(t(xt)|yt).

The transformation function t( ) for domain invariant features definition, is typically discovered by training an adversarial deep learning model, where the transformation converges to generate features where the source or target domains cannot be distinguished from each other while the loss of the regressive model predicting the output is minimized.

The following paper provides further background information: Y. Ganin, et al., "Domain-adversarial training of neural networks," Journal of Machine Learning Research, vol. 17, no. 59, pp. 1-35, (2016).

Example for Training the Transformer

The description assumes that the transformer has obtained rules 251/252 already. The following describes an optional approach to obtain the rules by applying adversarial (deep) learning.

The approach can be summarized by a couple of method steps that are presented as a sub-step of the step of obtaining rules 421 (cf. FIG. 5). Obtaining 421 the set of transformation rules 251/252 can be performed by the computer that repeats the following:

In a transforming step 431, and using a set of preliminary transformation rules, the computer transforms (first) multivariate measurement time-series 211 to (first) multi-variate feature time-series 231, and transforms the (second) multivariate measurement time-series 221 to a (second) multivariate feature time-series 241. Details have been described above.

In a discriminating step 441, the computer uses discriminator module 361 to differentiate (or "discriminate") the origin of the first and second feature time-series 231, 241 as originating from the (first) and (second) multi-variate measurement time-series 211, 221. In the initial repetitions, discriminator 361 can "easily" discriminate them. FIG. 2 symbolizes this by a diagram with the learn time (the overall time for the repetitions). On the left (early learning), the discriminator can make the difference: X to Y from 1 (the first machine/domain) or from 2 (the second machine/domain). On the right, the discriminator cannot.

In a modifying step 451, the computer modifies the set of preliminary transformation rules (or modifies the rules of the current repetition).

The computer repeats steps 431, 441, and 451 until discriminator 361 can no longer discriminate the data origin (i.e., from 1 or 2). To determine that it is no longer able to discriminate the data origin, discriminator 361 can calculate an adversarial loss ADLOSS. Discriminator 361 would continue to operate (and to let the rules change) until ADLOSS reaches a maximal value.

Transformation rules 251/252 become the final rules to be applied in the next steps.

In this particular approach, the rules are obtained by a learning process with a learning goal that appears paradoxically.

In other words, the combination of transformer 311/321 and discriminator 361 is being trained (with the setting changed for the rules) to classify (or "predict") if the features are related from the source machine or to the target machine.

In other words, the same encoder (or transformer, with the rules being prepared in the repetitions) is shared between the source and target domains (or first and second reference machine) and the encoder which is expected to extract domain-invariant representations with the help of an adversarial discriminator (i.e., discriminator 361).

For further details, the following papers can be consulted.

Zhang, et al., "Domain-Invariant Adversarial Learning for Unsupervised Domain Adaption", arXiv:1811.12751, (2018)

Xie, et al., "Learning Semantic Representations for Unsupervised Domain Adaptation@, Proceedings of the 35th International Conference on Machine Learning, PMLR 80:5423-5432, (2018)

Avisek Lahiri, et al., "Unsupervised Domain Adaptation for Learning Eye Gaze from a Million Synthetic Images: An Adversarial Approach", In Proceedings of the 11th Indian Conference on Computer Vision, Graphics and Image Processing (2018)

Adversarial training is further outlined in Goodfellow, Ian J., Pouget-Abadie, Jean, Mirza, Mehdi, Xu, Bing, Warde-Farley, David, Ozair, Sherjil, Courville, Aaron C., and Bengio, Yoshua. Generative adversarial nets. NIPS, 2014.

Obtaining the rules by a learning approach belongs to preparation phase **1. This is not the same as training the network to be explained next.

FIG. 3 illustrates reference industrial machine 112, transformer module 322 ("transformer 322" in short) and network 372 (under training) during training phase **2.

Transformer 322 transforms (step 452 in FIG. 5) multi-variate measurement time-series 212 to multi-variate feature time-series 323. Time-series 212 can be the same as time-series 211 (cf. FIG. 2). Transformer 322 applies the transformation rules 252 (cf. rules 251 in FIG. 2, when finalized). As symbolized by multiple overlay rectangles, transformer 322 processes multiple multi-variate measurement time-series (cf. Q as introduced in FIG. 2).

The computer receives (step 462 in FIG. 5) a uni-variate measurement time-series 272 (i.e., 1{Z1 . . . ZM}) with measurement data (Z) of the further process parameter (z) from reference machine 112, usually in multiple series as well. In that sense, industrial machine 112 acts as reference that provides measurement data from real measurement (such as from sensors X1 to XM and from sensor Z).

Network 372 is being trained (step 472 in FIG. 5) with the first multi-variate feature time-series (232) at the input, and with the uni-variate measurement time-series (272) at the output.

The person of skill in the art can perform training with appropriate hyperparameters, optimization goals and the like. By way of example, the training will be finalized when a loss function reaches a particular pre-defined value. During training, the intermediate calculation value LOSS (or "network loss") will change and eventually reach a minimum so the weights and the bias values can be taken over to the configuration. In other words, LOSS is a control parameter for network-internal processing loops.

LOSS can also be used for controlling loops that are external to network 372. The figure illustrates that intermediate calculation value LOSS can be provided by network 372. As it will be explained with respect to FIG. 7, LOSS can be used by selector trainer 380 in further loop. In other words, LOSS can also be a control parameter for one or more network-external processing loops.

Further, LOSS can be provided to transformer (cf. FIG. 2) as a parameter that optimizes the transformation rules.

FIG. 4 illustrates industrial machine 123 (of FIG. 1) and transformer module 323 (cf. FIG. 3) during the operation phase 3 to provide parameter indicator Z'. FIG. 4 is an updated version of FIG. 1** for that details have been explained above.

The computer receives (cf. step 513 in FIG. 5) multi-variate measurement time-series 223 (also noted 2{{X1 . . . XM}}N) with measurement data for industrial machine 123. Here, machine 123 is the machine under observation, without a sensor to measure parameter z.

Transformer 323 transforms multi-variate measurement time-series 223 to a multi-variate feature time-series 243 (also 2{{Y1 . . . YM}}K).

Network receives multi-variate feature time-series 243 and provides parameter indicator Z'. Network 373 is illustrated with configuration 283.

It is noted that—in difference to FIGS. 2-4—the time-series are singular time-series (i.e., for a particular working shift etc.)

FIG. 5 illustrates flowcharts of computer-implemented method 400 to a train neural network 372/373 and of computer-implemented method 500 to use the network during the operation of industrial machine 123.

Method 400 is a computer-implemented method to train neural network 373. Network 373 is being trained for later processing a multi-variate measurement time-series (cf. 223 in FIG. 1) with measurement data that represent instances of particular process parameters (cf. 183 in FIG. 1) of an industrial machine (cf. 123 in FIG. 1) and thereby to provide a parameter indicator Z' of a further process parameter (cf. 173, z in FIG. 1) for the industrial machine.

In step receiving 411, the computer receives a first multi-variate measurement time-series with historical measurement data from a first reference machine and a receives a second multi-variate measurement time-series with historical measurement data from a physically different second reference machine (1{{X1 . . . XM}}N) and 2{{X1 . . . XM}}N), cf. the left side of FIG. 2).

In obtaining step 421, the computer obtains a set of transformation rules 251/252 by processing the first and second multi-variate measurement time-series, such that the transformation rules 251/252 enable a transformer (cf. 311/321 in FIG. 2) to transform the first and second multi-variate measurement time-series into first and second multi-variate feature time-series (cf. 231, 241 in FIG. 2, also noted as 1{{Y1 . . . YM}}K, 2{{Y1 . . . YM}}K), respectively. The multi-variate feature time-series are invariant to domain differences of the first and second reference machines (cf. 111, 121, FIG. 2). (Both reference machines belong to different domains, with the details explained.)

In transforming step 452, the computer transforms the first multi-variate measurement time-series into a first multi-variate feature time-series by the transformer (322, in FIG. 3) that applies the transformation rules.

In receiving step (462), the computer receives a uni-variate measurement time-series with measurement data Z of the further process parameter z, from the first reference machine (cf. 112 in FIG. 3).

In step training 472 the neural network 372, the computer trains the network with the first multi-variate feature time-series at the input of the network, and with the uni-variate measurement time-series at the output of the network.

FIG. 5 also illustrates optional details (dashed boxes) for obtaining 421 the set of transformation rules. The computer performs steps 431, 441, and 451 in repetitions.

In transforming step 431, the computer transforms the first multi-variate measurement time-series to a first multi-variate feature time-series, and transforms the second multi-variate measurement time-series to a second multi-variate feature time-series, using a set of transformation rules that are preliminary rules.

In discriminating step 441, the computer runs discriminator 361 to differentiate (or discriminate) the origin of the first and second feature time-series as the first and second multi-variate measurement time-series.

In modifying step 451, the computer modifies the set of preliminary transformation rules.

The repetition step stops when the discriminator (361) can no longer discriminate the data origin (i.e., a REPEAT UNTIL or WHILE loop).

Details for the steps in method 400 are explained in the context of the description.

Regarding computer-implemented method 500 to use the network during the operation of the industrial machine, the figure illustrates the steps and refers to FIG. 4.

In step receiving 513, the computer receives a multi-variate measurement time-series with measurement data for an industrial machine under observation, in step transforming 523, it transforms the multi-variate measurement time-series to a multi-variate feature time-series, and in step operating 533, it operates network 373 to provide the parameter indicator Z'.

It is again noted that the computers for methods 400 and 500 can be physically different computers. The common data would be the configuration 283 (resulting from training).

Increasing Accuracy

As shortly mentioned above, the accuracy of indicator Z' corresponds to the difference to measurement data Z (if available). Much simplified, lower difference means higher accuracy.

The description will now explain two approaches that can increase the accuracy. Once approach (adaptation) increases the number of variates to be processed, and the other approach (selection) decreases the number of variates.

At first glance, both approaches seem to be contradicting, but they are related. For convenience, the description introduces them separately and discusses the relations afterwards.

Data Modality Adaptation

So far the description has explained the approach for measurement data in time-series comprising scalars only, with {X1 ... XM} being a sequence of M consecutive scalar values. It does not matter if the computer represents the scalar by an integer or by a real number.

The description now discusses how measurement data in other modalities can be adapted for processing.

FIG. 6 illustrates optional modality adapter module 393 (or "adapter" in short) that optionally implements a modality adaptation of measurement data. By way of example, the figure illustrates adapter 393 during operation phase **\*\*3, but adapter 393** can operated in other phases as well.

Adapter 393 receives multi-variate measurement time-series 213 (also noted as {{X1 ... XM}}) from an industrial machine (illustrated as machine 113 by way of example, but the data origin "1" or "2" does not matter). The term "receive" corresponds to method step 411 as well as to method step 513 (cf. FIG. 5). Adapter 393 can be implemented accordingly as part of the module that performs the receiving.

The multi-variate measurement time-series {{X1 ... XM}}N comprises uni-variate measurement time-series {X1 ... XM} that are sequences of scalar elements, or non-scalar elements. In the example, uni-variate time-series {X1 ... XM}n should comprise the non-scalar elements Xn.

As a side-note, in many situations, 1{Z1 ... ZM} would be scalar only. However, this is not required, so that 1{Z1 ... ZM} could also be a vector or the like.

Adapter 393 passes the time-series with scalars to other modules, substantially unchanged. These time-series do not even have to go through the adapter.

Adapter 393 processes the non-scalar elements Xn individually, but according to rules for each n. The figure illustrates the non-scalar element Xn highly symbolically. Thereby, the computer can process the elements and assign them a scalar (by classification) here given as Xn~. The ~ merely indicates that the assignment took place.

In a first scenario, the non-scalar elements are images (i.e., matrices with pixels that indicate colors). For example, the images show an inspection hole of the machine photographed every time interval Δt (the exposure time for the image can be neglected).

In the blast furnace example, the inspection uses the tuyeres and let the viewer see a fire inside the furnace. Fires occur during the operation regularly. Much simplified, an image showing fire can be coded to 1, and an image without fire to 0. The resulting time-series could be { ... }~={0, 0, 1, 1, 1, 0 ... 0, 0}~ and the computer would continue processing (by the steps that follow, such as obtain rules 421, or transform 523, cf. FIG. 5 or even receive 513).

In the second scenario, the non-scalar elements are sound sequences. For example, Xn can be an audio record for duration of the Δt=15 min time interval, from a microphone sensor. The person skilled in the art can apply appropriate sound processing, for example, by sampling the sound at a frequency of 20 kHz, leading to 15\*60\*20,000 audio samples per second.

Adapter 393 would then process these millions of samples to a single scalar. For example, the scalar could indicate: pitch rising during Δt, pitch falling during Δt, pitch constant during Δt, pitch rising and falling during Δt (as in the example) and so on.

Adapter 393 can be implemented by a neural network that has been trained before, potentially under supervision (by human experts). For example, adapter 393 could have been trained with annotated images showing fire (in blast furnaces), annotated sound sequences (taken from blast furnaces) and so on. Adapter 393 can also be trained in an unsupervised manner in order to identify an abstract representation of the image. That ensures the maximization of the informative content of the image. A sequence of images is then reduced by this process to few sequences of scalars.

Assigning a scalar does not necessarily mean that the measurement data is related to indicator Z'. The figures shows that the adaptation can use differently trained networks, so that the scalars can be different Xn~ and Xn~~ for the same input Xn. The "6" and "7" in the figures are just taken for illustration. The consequences for having different scalars for the same input will be discussed below.

Relevance Selection

Some process parameters are not related to parameter z. In other words, an overall set of process parameters (x_1 to x_N, with the cardinality of N variates) can be divided into a first sub-set of H process parameters x_1 to x_H that are related to parameter z ("relevant parameter set"), and a second sub-set of (N—H) process parameters that are not related to parameter z.

To use the music example, in a further excursion, it does not matter if a melody is played "largo" or "allegro", at least for the listener, the melody is the same.

In an ideal situation, network 373 would have been trained to simply ignore the measurement data for the parameters of the second sub-set. In realistic training scenarios, some measurement data (second sub-set) might still contribute to indicator Z'.

It is noted that training can be conducted without the participation of human experts. There is—however—no need to introduce such supervision to the training.

Experts for industrial machines can identify the relevant parameter set based on experience. Only measurement data with expert-identified relevance would go into the computers. Involving the expert at this point would be a once-only effort.

For example, the power consumption of the furnace may not influence the temperature (the exemplary z parameter) and consumption data may be disregarded (by not processing measurement for the consumption).

In addition to manual pre-selection and in alternative thereto, the relevance identification can be performed by the computer, by selecting measurement data. An example is explained next.

FIG. 7 illustrates optional data selector module 383 (or "selector" in short) that optionally implements a selection of relevant measurement data. The figure illustrates selector 383 during operation phase 3 at the top, and illustrates its conditioning during phases 1 and **2 by repeating some method steps from FIG. 5.

In operation, selector 383 receives multi-variate measurement time-series 223 (cf. FIGS. 1 and 3, also noted $\{\{X1 \ldots XM\}\}N$) and forwards modified multi-variate measurement time-series 223 (also noted $\{\{X1 \ldots XM\}\}H$) to transformer 323 (cf. FIG. 4).

The modification is a selection (i.e., a positive selection from N variates to H variates in $\{\{ \ldots \}\}H$, with H<N). In other words, this corresponds to the selection of the relevant parameter set (but at measurement data level). The figure illustrates the selection by showing less sensor symbols at the output of selector 383 (compared to the machine).

Performing method 500 (cf. FIG. 5) with a reduced set of measurement data can improve the accuracy of providing indicator Z'. This approach may appear paradoxically: the selector blocks some data to be processed by the network but the accuracy may rise. However, the selection sorts out measurement data that network 373 potentially cannot ignore and that potentially could decrease the accuracy. Again, the unsupervised nature of training the network (cf. FIGS. 2-4) is noted.

Selector 383 can be configured by a learning process that uses the loss function of network 372/373 as a value to minimize. This approach is symbolized by selector trainer module 380 (or "selector trainer" in short).

Selector trainer 380 communicates with other modules, such as with network 372 (under training, receiving LOSS) and performs a method that is symbolized by a flowchart.

In repetitions, until the intermediate value LOSS—in other words the loss function—has a minimum ("min loss", YES), selector trainer 380 changes a (preliminary) selection ($\{\{ \ldots \}\}H \, E \, \{\{ \ldots \}\}N$) and let the components perform method 400 (cf. FIG. 4), that means (optionally) receive 411, obtain rules 421, transform 452, (optionally) receive 462 and train 472. Receiving is optional, because the received data remains unchanged.

In other words, a preliminary selection $\{\{ \ldots \}\}H$ of variate is replaced by another selection until LOSS is minimal for a final selection.

The explanation is simplified, and the skilled person can implement the method accordingly. For example, there is no need to repeat receiving step 462 (because $1\{Z1 \ldots ZM\}$ is not to be de-selected).

Once the loss function reaches a minimum, operations explained in FIGS. 1-5 are performed with $\{\{ \ldots \}\}H$ instead of $\{\{ \ldots \}\}N$ (i.e., during the operation phase **3 as explained for the top of the figure).

Optionally, the operation of selector 383 can be enhanced by selecting some variates of the measurement time-series and by combining or merging them to a resulting measurement time-series. For example, selector 383 could select $\{ \ldots \}1, \{ \ldots \}2,$ and $\{ \ldots \}3$ (such as temperatures from 3 locations) and combine them to a new uni-variate measurement time-series (to be part of $\{\{ \ldots \}\}H$).

The person of skill in the art can implement such as selection-combination by principal component analysis.

Discussion

The modules that perform data modality adaptation (cf. FIG. 6) and relevance selection (cf. FIG. 7) operate independently from each other in phase **3.

To save computation resources, it is however convenient to let data selector 383 operate in preference over modality adapter 393, at least during the operation phase **3. For example, there is no need to process an audio record into a scalar (cf. FIG. 6) and then filter the scalar out by selector 383.

Although to-scalar-adaptation lets the network process more data, some adaptation may introduce errors. By assigning scalars, adapter may apply differently trained networks. Some results may be relevant for Z', some others not. For example, the analysis of the sound sequences into categories such as rising/falling/constant pitch may not be related to Z', but analysis into other categories such as oscillating/stable sound may be related to Z' indeed. In that sense, differently obtained scalars Xn~ and Xn~~ (cf. FIG. 6) could be treated as a relevance selection (FIG. 7).

Feeding Back the Network Loss

The description now shortly returns to FIGS. 2-3. As already explained, the transformation rules are obtained in the preparation phase **1 so that the transformer provides feature time-series that are invariant to domain differences. Adversarial loss (ADLOSS cf. FIG. 2) is a criterion.

To further increase the accuracy, the transformation rules can be enhanced by considering the network loss (LOSS cf. FIG. 3). Thereby, the computer can operate in a loop that comprises steps of the preparation phase 1 and the training phase 2 (that is performed as preliminary training).

In other words, the steps of obtaining 421 a set of transformation rules and of training 472 neural network 372 are repeated. Transformer 311/321 further receives network loss (LOSS) provided by the network under training. The repetition can stop for minimal network loss LOSS.

To illustrates this optional approach, FIG. 2 shows the reception of LOSS by a dashed line. While ADLOSS is maximized, LOSS is minimized. The skilled person can apply other conventions.

Use-Case

Figure 8:
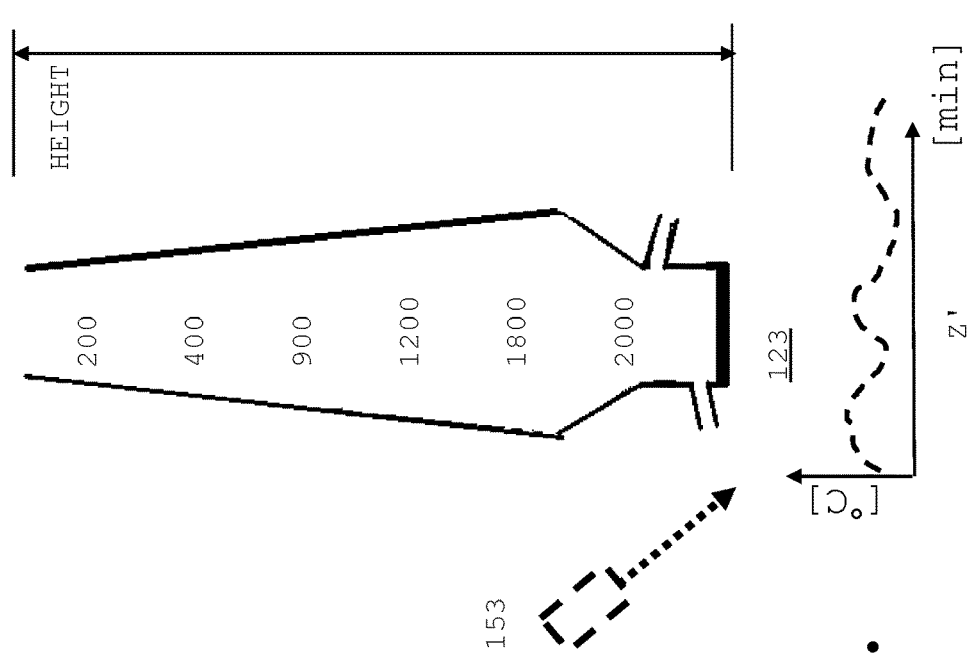
FIG. 8 illustrates a use-case with the industrial machines being blast furnaces.
Figure 8:
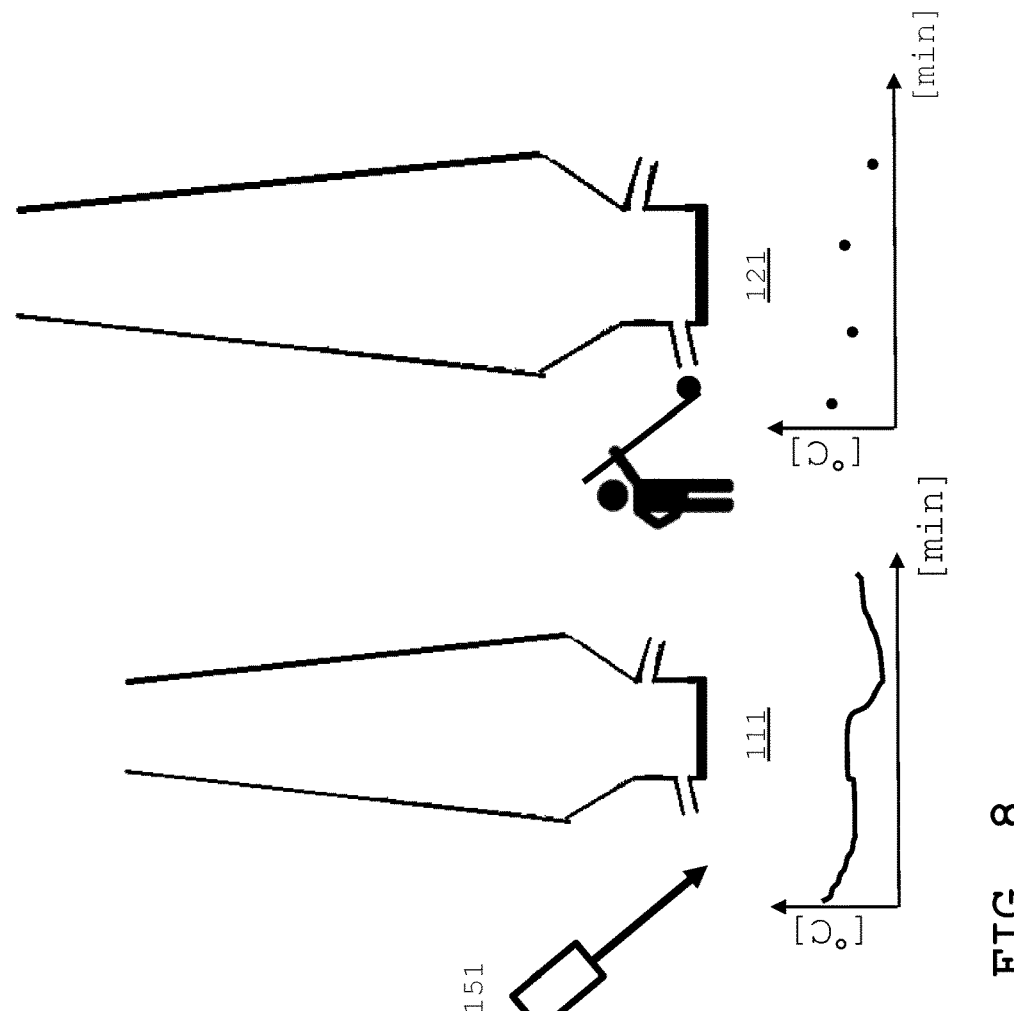

FIG. 8 illustrates a use-case with industrial machines 111, 121 and 123 being blast furnaces. There are multiple temperature parameters (symbolized by different values from 200° C. to 2000° C.) and other process parameters (such a pressure values, chemical composition of materials, etc.).

Domain differences are illustrated by two examples: The size difference is symbolized by furnace 111 being smaller than furnaces 121 and 123. Furnaces 111 and 121 apply different measurement methods for the temperature of the molten material (hot metal temperature): far-distance sensor 151 (camera symbol) at furnace 111 leads to a time-series with samples available at Δt (e.g., 15 min). Manual measurement by the operator of furnace 121 leads to temperature values available at larger intervals (e.g., 90 min), as mentioned in the background section.

In this exemplary use case, virtual sensor 153 obtains indicator Z' (for the temperature), at Δt. Although illustrated by a small and dotted symbol camera symbol, this virtual sensor stands for the computer executing method 500 (cf. FIG. 5). In other words, the figure generally illustrates the use of the computer performing (or executing) method 500 (and being trained according to method 400) to obtain parameter indicator Z' that represents a parameter of an industrial machine. This use of the computer that performs method 500 can be regarded as a using a virtual sensor.

Furnaces 121 and 123 can be physically the same things, but furnace 123 operates in the future, one network 372/373 has been trained. The figure does not illustrate the operator of furnace 123 taking samples and thereby indicates that the use case helps to minimize human involvement in measuring and that operator can better concentrate on the operation of the furnace. In other words, furnace 121 can be upgraded to furnace 123 by the additional virtual sensor.

Using virtual sensors provides opportunities to compares existing industrial machine by measuring process parameters for that otherwise data would have been missing.

Use of Artificial Measurement Data as Training Data

Indicator Z' can be used as training data, as complementary historic data.

Generic Computer

Figure 9:
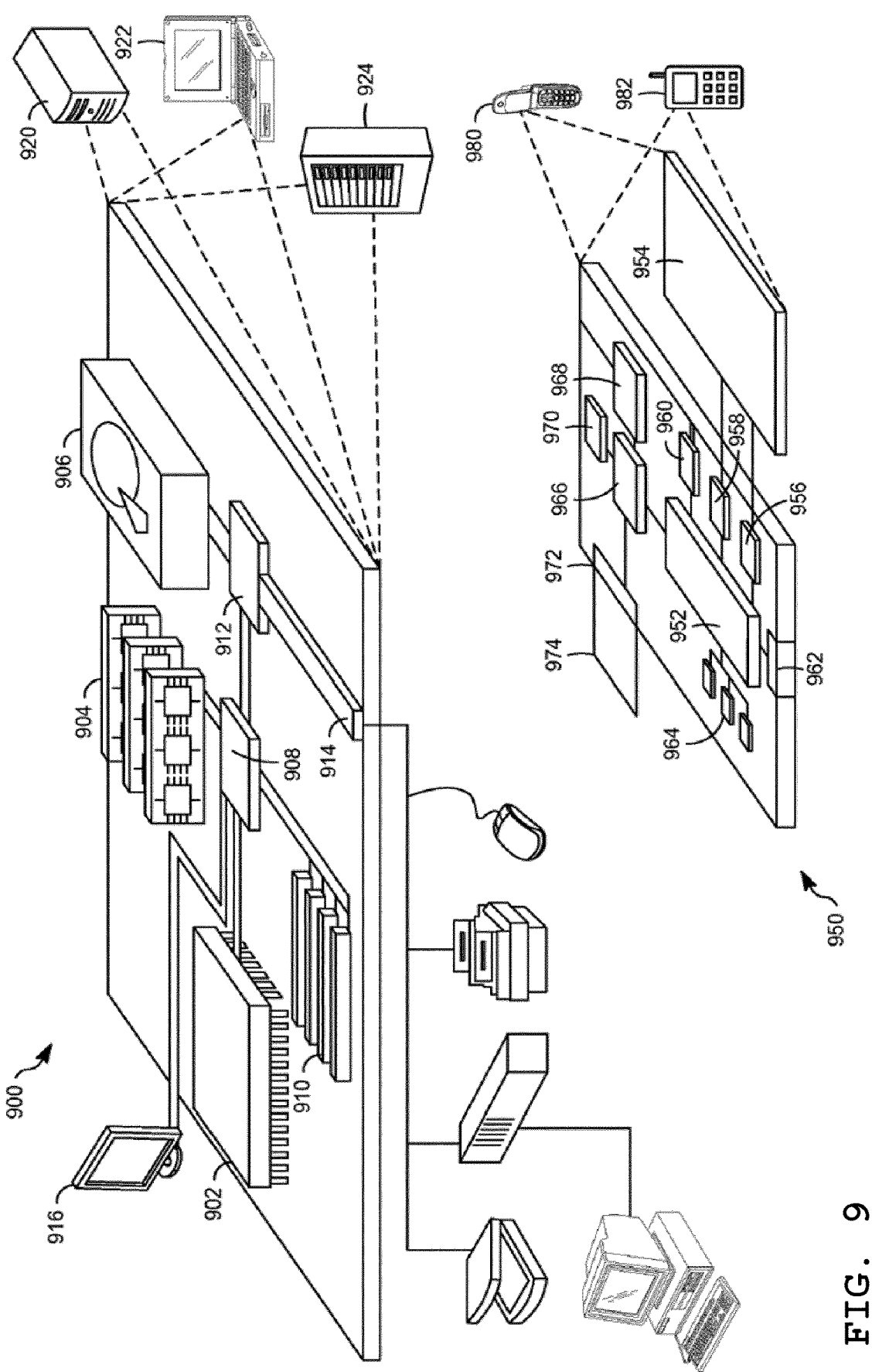
FIG. 9 illustrates an example of a generic computer device which may be used with the techniques described here.

FIG. 9 illustrates an example of a generic computer device which may be used with the techniques described here. FIG. 9 is a diagram that shows an example of a generic computer device 900 and a generic mobile computer device 950, which may be used with the techniques described here. Computing device 900 is intended to represent various forms of digital computers, such as laptops, desktops, workstations, personal digital assistants, servers, blade servers, mainframes, and other appropriate computers. Generic computer device may 900 correspond to the computer system 100 of FIG. 1. Computing device 950 is intended to represent various forms of mobile devices, such as personal digital assistants, cellular telephones, smart phones, driving assistance systems or board computers of vehicles (e.g., vehicles 401, 402, 403, cf. FIG. 1) and other similar computing devices. For example, computing device 950 may be used as a frontend by a user (e.g., an operator of a blast furnace) to interact with the computing device 900. The components shown here, their connections and relationships, and their functions, are meant to be exemplary only, and are not meant to limit implementations of the inventions described and/or claimed in this document.

Computing device 900 includes a processor 902, memory 904, a storage device 906, a high-speed interface 908 connecting to memory 904 and high-speed expansion ports 910, and a low speed interface 912 connecting to low speed bus 914 and storage device 906. Each of the components 902, 904, 906, 908, 910, and 912, are interconnected using various busses, and may be mounted on a common motherboard or in other manners as appropriate. The processor 902 can process instructions for execution within the computing device 900, including instructions stored in the memory 904 or on the storage device 906 to display graphical information for a GUI on an external input/output device, such as display 916 coupled to high speed interface 908. In other implementations, multiple processors and/or multiple buses may be used, as appropriate, along with multiple memories and types of memory. Also, multiple computing devices 900 may be connected, with each device providing portions of the necessary operations (e.g., as a server bank, a group of blade servers, or a multi-processor system).

The memory 904 stores information within the computing device 900. In one implementation, the memory 904 is a volatile memory unit or units. In another implementation, the memory 904 is a non-volatile memory unit or units. The memory 904 may also be another form of computer-readable medium, such as a magnetic or optical disk.

The storage device 906 is capable of providing mass storage for the computing device 900. In one implementation, the storage device 906 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 904, the storage device 906, or memory on processor 902.

The high speed controller 908 manages bandwidth-intensive operations for the computing device 900, while the low speed controller 912 manages lower bandwidth-intensive operations. Such allocation of functions is exemplary only. In one implementation, the high-speed controller 908 is coupled to memory 904, display 916 (e.g., through a graphics processor or accelerator), and to high-speed expansion ports 910, which may accept various expansion cards (not shown). In the implementation, low-speed controller 912 is coupled to storage device 906 and low-speed expansion port 914. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 900 may be implemented in a number of different forms, as shown in the figure. For example, it may be implemented as a standard server 920, or multiple times in a group of such servers. It may also be implemented as part of a rack server system 924. In addition, it may be implemented in a personal computer such as a laptop computer 922. Alternatively, components from computing device 900 may be combined with other components in a mobile device (not shown), such as device 950. Each of such devices may contain one or more of computing device 900, 950, and an entire system may be made up of multiple computing devices 900, 950 communicating with each other.

Computing device 950 includes a processor 952, memory 964, an input/output device such as a display 954, a communication interface 966, and a transceiver 968, among other components. The device 950 may also be provided with a storage device, such as a microdrive or other device, to provide additional storage. Each of the components 950, 952, 964, 954, 966, and 968, are interconnected using various buses, and several of the components may be mounted on a common motherboard or in other manners as appropriate.

The processor 952 can execute instructions within the computing device 950, including instructions stored in the memory 964. The processor may be implemented as a chipset of chips that include separate and multiple analog and digital processors. The processor may provide, for example, for coordination of the other components of the device 950, such as control of user interfaces, applications run by device 950, and wireless communication by device 950.

Processor 952 may communicate with a user through control interface 958 and display interface 956 coupled to a display 954. The display 954 may be, for example, a TFT LCD (Thin-Film-Transistor Liquid Crystal Display) or an OLED (Organic Light Emitting Diode) display, or other appropriate display technology. The display interface 956 may comprise appropriate circuitry for driving the display 954 to present graphical and other information to a user. The control interface 958 may receive commands from a user and convert them for submission to the processor 952. In addition, an external interface 962 may be provide in communication with processor 952, so as to enable near area communication of device 950 with other devices. External interface 962 may provide, for example, for wired communication in some implementations, or for wireless communication in other implementations, and multiple interfaces may also be used.

The memory 964 stores information within the computing device 950. The memory 964 can be implemented as one or more of a computer-readable medium or media, a volatile memory unit or units, or a non-volatile memory unit or units. Expansion memory 984 may also be provided and connected to device 950 through expansion interface 982, which may include, for example, a SIMM (Single In Line Memory Module) card interface. Such expansion memory 984 may provide extra storage space for device 950, or may also store applications or other information for device 950. Specifically, expansion memory 984 may include instructions to carry out or supplement the processes described above, and may include secure information also. Thus, for example, expansion memory 984 may act as a security module for device 950, and may be programmed with instructions that permit secure use of device 950. In addition, secure applications may be provided via the SIMM cards, along with additional information, such as placing the identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 964, expansion memory 984, or memory on processor 952 that may be received, for example, over transceiver 968 or external interface 962.

Device 950 may communicate wirelessly through communication interface 966, which may include digital signal processing circuitry where necessary. Communication interface 966 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 968. In addition, short-range communication may occur, such as using a Bluetooth, WiFi, or other such transceiver (not shown). In addition, GPS (Global Positioning System) receiver module 980 may provide additional navigation- and location-related wireless data to device 950, which may be used as appropriate by applications running on device 950.

Device 950 may also communicate audibly using audio codec 960, which may receive spoken information from a user and convert it to usable digital information. Audio codec 960 may likewise generate audible sound for a user, such as through a speaker, e.g., in a handset of device 950. Such sound may include sound from voice telephone calls, may include recorded sound (e.g., voice messages, music files, etc.) and may also include sound generated by applications operating on device 950.

The computing device 950 may be implemented in a number of different forms, as shown in the figure. For example, it may be implemented as a cellular telephone 980. It may also be implemented as part of a smart phone 982, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing device that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing device can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made without departing from the spirit and scope of the invention.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

The invention claimed is:

1. Computer-implemented method to train a neural network, wherein the network is being trained for later processing a multi-variate measurement time-series with measurement data that represent instances of particular process parameters of an industrial machine and thereby to provide a parameter indicator (Z') of a further process parameter for the industrial machine, the method comprising:

receiving a first multi-variate measurement time-series with historical measurement data from a first reference machine and a second multi-variate measurement time-series with historical measurement data from a physically different second reference machine;

obtaining a set of transformation rules by processing the first and second multi-variate measurement time-series, such that the transformation rules enable a transformer module to transform the first and second multi-variate measurement time-series into first and second multi-variate feature time-series, respectively, with the multi-variate feature time-series being invariant to domain differences of the first and second reference machines;

transforming the first multi-variate measurement time-series to a first multi-variate feature time-series by the transformer module that applies the transformation rules;

receiving a uni-variate measurement time-series with measurement data of the further process parameter, from the first reference machine; and training the neural network with the first multi-variate feature time-series at the input, and with the uni-variate measurement time-series at the output.

2. Method according to claim 1, wherein obtaining the set of transformation rules is performed by the computer, with in repetitions:

transforming the first multi-variate measurement time-series to a first multi-variate feature time-series, and transforming the second multi-variate measurement time-series to a second multi-variate feature time-series, using a set of preliminary transformation rules;

discriminating, by a discriminator module the origin of the first and second feature time-series as the first and second multi-variate measurement time-series; and modifying the set of preliminary transformation rules, until the discriminator module can no longer discriminate the data origin (1, 2).

3. The method according to claim 2, wherein the discriminator module determines that is can no longer discriminate the data origin by operating until an adversarial loss reaches a maximal value.

4. The method according to claim 2, wherein the steps of obtaining a set of transformation rules and of training the neural network are repeated, wherein the transformer module further receives network loss (LOSS) provided by the neural network under training so that the repetition stops for minimal network loss.

5. Method according to claim 1, wherein the combination of the transformer module and the discriminator module operates as a generative adversarial network.

6. Method according to claim 1, wherein the method steps of receiving multivariate measurement time-series, obtaining the set of transformation rules, transforming and training the neural network are performed for multi-variate measurement time-series for that the variates have been determined to be related to the further process parameter by a data selector module.

7. Method according to claim 6, wherein the data selector module is being trained by a selector trainer module that causes the computer to repeat the method steps obtaining, transforming and training, with the criterium to minimize a loss function during the training of the neural network.

8. Method according to claim 1, wherein receiving the first and second multi-variate measurement time-series with historical data is performed after adapting the data modality of the measurement data.

9. Method according to claim 8, wherein adapting the data modality is performed by steps, selected from the following: analyzing measurement data with sound samples by classifying the sound samples to categories, and analyzing measurement data with images by classifying the images to categories.

10. Method according to claim 8, wherein adapting is repeated for different goals, with goals being selected while minimizing the loss function during the training of the neural network.

11. Method according to claim 1, wherein the neural network is a regression neural network.

12. Method according to claim 1, wherein the measurement data is related to process parameters that are physical properties, selected from the following: temperature, pressure, chemical composition of materials within the machine, visual appearance of a part of the industrial machine, and sound emitted by the industrial machine.

13. Method according to claim 1, wherein the industrial machines are selected from chemical reactors, metallurgical furnaces, vessels, and engines.

14. Computer-implemented method for operating the neural network previously trained according to a method according to claim 1, the method for operating with the following steps:

receiving a multi-variate measurement time-series with measurement data for an industrial machine under observation;

transforming the multi-variate measurement time-series to a multi-variate feature time-series, and operating the neural network to provide the parameter indicator (Z').

15. Method according to claim 14, wherein operating the neural network occurs in situations selected from the following: sensor failure, data connection failure, minimization of human involvement for measuring.

16. A computer program product that, when loaded into a memory of a computer system and executed by at least one processor of the computer system, causes the computer system to perform the steps of a computer-implemented method according to claim 1.

17. A computer system comprising a plurality of computer-implemented modules which, when executed by the computer system, perform the steps of the computer-imple-
mented method according to claim 1.

\* \* \* \* \*